United States Patent
Roger et al.

(10) Patent No.: US 10,101,482 B2
(45) Date of Patent: Oct. 16, 2018

(54) METHOD FOR STEERING A TOWED ACOUSTIC LINEAR ANTENNA

(71) Applicant: SERCEL, Carquefou (FR)

(72) Inventors: Thierry Roger, Nantes (FR); Gaetan Mellier, Houston, TX (US); Christophe L'Her, Loperhet (FR)

(73) Assignee: SERCEL, Carquefou (FR)

( * ) Notice: Subject to any disclaimer, the term of this patent is extended or adjusted under 35 U.S.C. 154(b) by 164 days.

(21) Appl. No.: 15/065,023

(22) Filed: Mar. 9, 2016

(65) Prior Publication Data

US 2016/0187518 A1 Jun. 30, 2016

Related U.S. Application Data

(63) Continuation of application No. 13/950,057, filed on Jul. 24, 2013, now Pat. No. 9,322,946.

(30) Foreign Application Priority Data

Jul. 25, 2012 (EP) ..................................... 12305910

(51) Int. Cl.
 *G01V 1/38* (2006.01)
(52) U.S. Cl.
 CPC .................................. *G01V 1/3826* (2013.01)
(58) Field of Classification Search
 CPC .................................................... G01V 1/38
 See application file for complete search history.

(56) References Cited

U.S. PATENT DOCUMENTS

| 4,660,185 A | 4/1987 | French |
| 4,992,990 A * | 2/1991 | Langeland .............. G01S 15/87 367/19 |
| 2002/0126575 A1 | 9/2002 | Bittleston |
| 2005/0188908 A1 | 9/2005 | Hillesund et al. |
| 2009/0141587 A1 | 6/2009 | Welker et al. |

(Continued)

FOREIGN PATENT DOCUMENTS

| EP | 1868011 A2 | 12/2007 |
| EP | 2 541 283 A1 | 1/2013 |

OTHER PUBLICATIONS

Office Action in corresponding Chinese Application No. 2013103177093.X dated Sep. 1, 2016.
(Continued)

*Primary Examiner* — Hovhannes Baghdasaryan
(74) *Attorney, Agent, or Firm* — Patent Portfolio Builders PLLC

(57) ABSTRACT

A method and apparatus are provided for steering a first acoustic linear antenna belonging to a plurality of acoustic linear antennas towed by a vessel. A plurality of navigation control devices are arranged along the plurality of linear antennas in order to act at least laterally on the position of the linear antennas. At least one of the navigation control devices arranged along the first acoustic linear antenna performs steps of: obtaining a local measurement of a feather angle or of a parameter linked to the feather angle, the local measurement being associated with the at least one of the navigation control devices arranged along the first acoustic linear antenna; computing a lateral force, as a function of the obtained local measurement; and applying the computed lateral force.

20 Claims, 5 Drawing Sheets

(56) References Cited

U.S. PATENT DOCUMENTS

| | | | |
|---|---|---|---|
| 2010/0118644 A1* | 5/2010 | Seale | G01V 1/3826 |
| | | | 367/16 |
| 2010/0202249 A1 | 8/2010 | Goujon et al. | |
| 2010/0254216 A1* | 10/2010 | Toennessen | B63B 21/66 |
| | | | 367/20 |
| 2010/0307402 A1 | 12/2010 | Rinnan et al. | |
| 2011/0286301 A1 | 11/2011 | Seale | |
| 2011/0286302 A1 | 11/2011 | Welker et al. | |
| 2012/0095629 A1 | 4/2012 | Fjellstad et al. | |

OTHER PUBLICATIONS

European Search Report and Written Opinion dated Dec. 21, 2012, for corresponding European Application No. 12305910, filed Jul. 25, 2012.

* cited by examiner

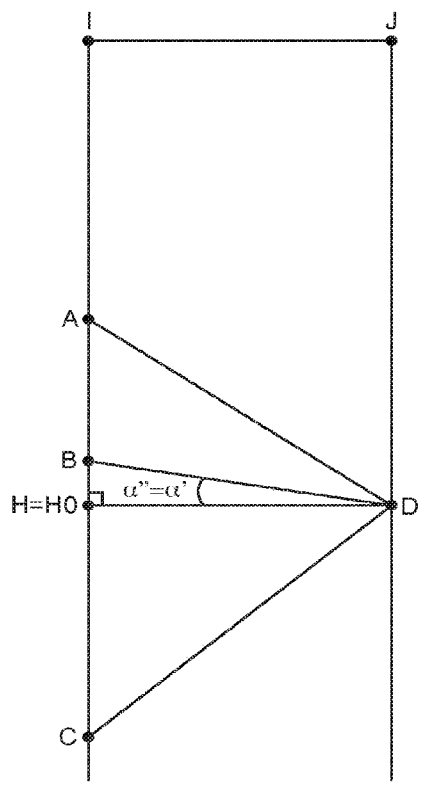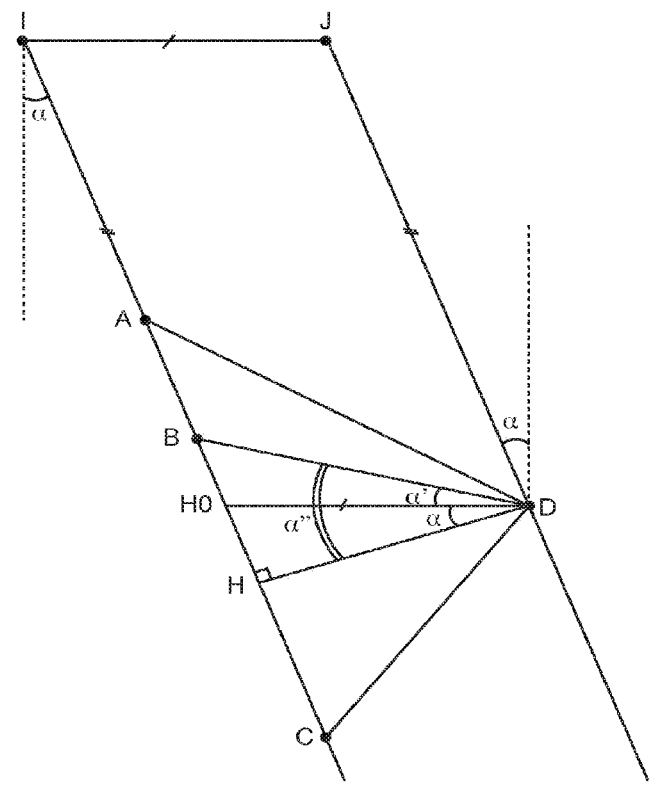
Fig. 9A
Fig. 9B

MÉTHOD FOR STEERING A TOWED
ACOUSTIC LINEAR ANTENNA

1. FIELD OF THE DISCLOSURE

The field of the disclosure is the acquisition of geophysics data. It deals with the equipments required in order to study the sea bed and its sediment layers properties.

More specifically, the disclosure pertains to a technique for steering a towed acoustic linear antenna.

The disclosure can be applied notably to the oil prospecting industry using seismic method (sea oil survey), but can be of interest for any other field which requires a system performing geophysics data acquisition in a marine environment.

2. TECHNOLOGICAL BACKGROUND

It is sought more particularly here below in this document to describe problems existing in the field of seismic data acquisition for oil prospecting industry. The present disclosure of course is not limited to this particular field of application but is of interest for any technique that has to cope with closely related or similar issues and problems.

The operations of acquiring seismic data on site conventionally use networks of sensors (here below designated as "hydrophones" with regard to the acquisition of data in a marine environment). Arrays of hydrophones are forming channels. Several channels are distributed along cable in order to form linear acoustic antennas normally referred to as "streamers" or "seismic streamers".

As shown in FIG. 1, the network of seismic streamers 20a to 20e is towed by a seismic vessel 21. The hydrophones are referenced 16 in FIG. 2, which illustrates in detail the block referenced C in FIG. 1 (i.e. a portion of the streamer referenced 20a).

The seismic method is based on analysis of reflected seismic waves. Thus, to collect geophysical data in a marine environment, one or more submerged seismic sources are activated in order to propagate omni-directional seismic wave trains. The pressure wave generated by the seismic source passes through the column of water and insonifies the different layers of the sea bed. Part of the seismic waves (i.e. acoustic signals) reflected are then detected by the hydrophones distributed over the length of the seismic streamers. These acoustic signals are processed and retransmitted by telemetry from the seismic streamers to the operator station situated on the seismic vessel, where the processing of the raw data is carried out.

In practice, it is aimed to carry out an analyze of sea bed with a minimum number of passage of the vessel in the concerned area. For that purpose, the number of streamers implemented in the acoustic network is substantially raised and the length of the streamers may vary between 6 and 15 kilometers, for example.

Control of the positions of streamers lies in the implementation of navigation control devices, commonly referred to as "birds" (white squares referenced 10 in FIG. 1). They are installed at regular intervals (every 300 meters for example) along the seismic streamers. The function of those birds is to guide the streamers between themselves. In other words, the birds are used to control the depth as well as the lateral position of the streamers. For this purpose, and as illustrated in FIG. 2, each bird 10 comprises a body 11 equipped with motorized pivoting wings 12 (or more generally means of mechanical moving) making it possible to modify the position of the streamers laterally between them (this is referred to a horizontal driving) and drive the streamers in immersion (this is referred to a vertical driving).

To carry out the localization of the seismic streamers (allowing a precise horizontal driving of the streamers by the birds), acoustic nodes are distributed along the streamers. These acoustic nodes are represented by hatched squares, referenced 14, in FIGS. 1 and 2. As shown in FIG. 1, some acoustic nodes 14 of the network are integrated in a bird 10 (case of FIG. 2), and other are not.

The acoustic nodes 14 use underwater acoustic communication means, hereafter referred to as electro-acoustic transducers, allowing to estimate the distances between acoustic nodes (named here below "inter-node distances"). More specifically, these transducers are transmitters and receivers of acoustic signals, which can be used to estimate an inter-node distance separating two acoustic nodes (acting as sender node and receiver node respectively) situated on two different streamers (which may be adjacent or not) as a function of an acoustic signal propagation duration measured between these two nodes (i.e. a travel time of the acoustic signal from the sender node to the receiver node). From the acoustic network, this thereby forms a mesh of inter-node distances allowing to know precise horizontal steering of all the streamers. Transducer here is understood to mean either a single electro-acoustic device consisting of a transceiver (emitter/receiver) of acoustic signals, or a combination of a sender device (e.g. a pinger) and a receiver device (e.g. a pressure particle sensor (hydrophone) or a motion particle sensor (accelerometer, geophone . . . )). Usually, each acoustic node comprises an electro-acoustic transducer enabling it to behave alternately as a sender node and a receiver node (for the transmission and the reception, respectively, of acoustic signals). In an alternative embodiment, a first set of nodes act only as sender nodes and a second set of nodes act only as receiver nodes. A third set of nodes (each acting alternately as a sender node and a receiver node) can also be used in combination with the first and second sets of nodes.

The inter-node distance $d_{AB}$ between two nodes A and B can be typically estimated on the basis of the following formula: $d_{AB}=c \cdot t_{AB}$, with: node A acting as a sender node which transmits an acoustic signal S to node B acting as a receiver node (see example in FIG. 1, with acoustic signal S shown as an arrow between nodes referenced A and B); $t_{AB}$, the propagation duration (travel time) elapsed between the emission instant and reception instant of the acoustic signal transmitted from the sender node A to the receiver node B (assuming that the receiver node and the sender node are synchronized); and c, a "measured" or "estimated" value of sound speed (also referred to as sound velocity) of the acoustic signal.

FIG. 3 illustrates the binning coverage. We consider two successive shots of a seismic source: the first shot is illustrated in the upper part of FIG. 3 and the second shot is illustrated in the lower part of FIG. 3 (i.e. the source and the streamer are towed from the right to the left in this example). At each shot of the seismic source, a step of processing is the assignment of each channel to a bin. Bins represent local areas (e.g. 8 m×8 m) on the Earth's surface which have been probed by some channels during the seismic survey, i.e. which have been hit by some rays coming from the source and whose reflected ray is received by a channel.

When several traces can be assigned to the same bin, then the signal to noise ratio may be improved with a processing called "stacking" of the seismic data. The number of different rays reflected on the same bin is called "coverage". One of the aims of a seismic survey is to get a uniform coverage of the binning grid. However, different events can affect the coverage of the binning grid, such as a feather angle α on the streamers S1-S4 (towed by a seismic vessel 21 via a head rigging 43) caused by a lateral sea current 41 (as illustrated in FIG. 4), a V-shape of the streamer network caused by the vessel's wash, or more generally the distortion of streamers. The feather angle α is the angle formed by a streamer (e.g. S1) relative to the axis 42 along which the vessel 21 moves.

During seismic surveys, the areas to cover are actually skimmed by lines. If we observe a binning grid, with the coverage of each bin, we can see some gaps between adjacent lines which are mainly due to feather angle effect on the network. When the coverage between adjacent lines of the survey is poor, then additional lines called "infill lines" are required, which is time and cost-consuming.

In the last decade, prospectors have equipped the streamers with instruments which permit to control them laterally. As already discussed above, these instruments are navigation control devices ("birds") which allow maintaining a lateral distance between streamers, which have the effect of suppressing the V-shape and any individual streamer distortion. Sometimes, these instruments are also used to guarantee a stable V-shape, which is also beneficial for coverage.

Besides, some current models which include meteorological data and satellite observations, added by onboard Acoustic Doppler Current Profiling (ADCP) permit predicting streamer distortion and controlling the navigation control devices ("birds") as a function of the current prediction information. This allows to minimize "infill lines" and to maximize four dimensional (4D) repeatability. A four dimensional seismic survey is a three dimensional survey over a same area of the Earth's subsurface at selected time.

However, despite the integration of navigation control devices ("birds", i.e. means of lateral control of streamers), there is still sometimes a had coverage of the seismic area and/or a lack of repeatability, mainly due to the feather angle of streamers which can change during a vintage and from a vintage to another, or between two adjacent lines, creating gaps in the coverage.

Moreover, on some systems, all the lateral control is referred to a reference streamer, also called "master streamer". In this case, as all adjacent streamers are referred to the master streamer thanks to a local control of the lateral forces, a feather angle of the master streamer tends to create the same feather angle for all the spread (i.e. all the adjacent streamers). For example, in FIG. 4, if S is the Master streamer, the slave streamers S2, S3 and S4 have the same feather angle α as S1.

Another drawback of these systems is that if no global control of the navigation control devices (in order to operate a lateral control of the master streamer) is carried out, the shape and direction of the master streamer vary with the current, inducing a feather angle on the streamers caused in case of lateral sea current. If a global control is carried out by a navigation system (on board of the seismic vessel), this is not an optimal solution to keep a stable network in the following situations:

disconnection or cut of streamers, each streamer being connected to a seismic data acquisition system onboard the vessel;
break on a telemetry line between a navigation control device ("bird") and the onboard control system of the navigation control devices;
loss of the link between the navigation system and the control system of the navigation control devices.

It must also be noted that between each line of a seismic survey, the vessel realizes a turn of approximately 3°/mn.

The time required to stabilize the streamer network is important and is mainly dependant on the vessel speed because the network is generally free in feather angle. The streamer network distortion due to a turn is close to the streamer network distortion doe to a lateral sea current. Therefore, the different drawbacks of the prior art solutions, described above in the case of a lateral sea current are substantially the same the case of a turn.

3. SUMMARY

A particular embodiment of the invention proposes a method for steering a first acoustic linear antenna belonging to a plurality of acoustic linear antennas towed by a vessel, a plurality of navigation control devices being arranged along said plurality of linear antennas in order to act at least laterally on the position of said linear antennas. At least one of the navigation control devices arranged along said first acoustic linear antenna performs steps of:

obtaining a local measurement of a feather angle or of a parameter linked to the feather angle, said local measurement being associated with said at least one of the navigation control devices arranged along said first acoustic linear antenna;
computing a lateral force, as a function of the obtained local measurement; and
applying the computed lateral force.

Thus, this particular embodiment relies on a wholly novel and inventive approach taking advantage of the fact that the feather angle (or a parameter linked to the feather angle) is used as an input information to compute the lateral force to apply. This allows to improve binning coverage and 4D repeatability of marine surveys.

According to a particular feature, each of the navigation control devices arranged along said first acoustic linear antenna performs said steps of obtaining, computing and applying.

Thus, the steering is optimized.

According to a particular feature, said first linear antenna is a master linear antenna to which at least one slave linear antenna, belonging to said plurality of acoustic linear antennas, is referred to.

Thus, an embodiment the invention is carried out only once, for the master linear antenna (master streamer).

According to a particular feature, said parameter linked to the feather angle is a distance separating:

a reference acoustic node, arranged along another linear antenna among said plurality of acoustic linear antennas; and
a point which is an orthogonal projection, on said other acoustic linear antenna, of said at least one of the navigation control devices.

According to a particular feature, the step of computing the lateral force comprises a step of carrying out a control loop which enslaves the obtained local measurement on a setpoint.

Thus, the computing of the lateral force is implemented in a simple manner.

In a first implementation, said setpoint is a predetermined value.

This allows to keep an optimised feather angle of the linear antenna (streamer), even if none connection to a master streamer controller is available (streamer disconnection, a master streamer controller powered off, etc).

In a second implementation, the step of computing the lateral force comprises a step of dynamically computing said setpoint, as a value of a global feather angle or a global parameter linked to the global feather angle, said global feather angle being a mean feather angle over said first linear antenna.

Indeed, it may be beneficial for binning coverage or 4D repeatability to remove streamer distortion instead of trying to reduce to a predetermined value (e.g. 7°) the streamer feather angle without reducing the streamer distortion.

According to a particular feature of this second implementation, the global feather angle is computed as a function of acoustic signals, geodetic positions and compass bearing.

Thus, the global feather angle is computed dynamically.

According to a particular feature, the step of obtaining the local measurement comprises steps of:
  obtaining acoustic signals transmitted between acoustic nodes arranged along a couple of linear antennas comprising said first linear antenna and another linear antenna among said plurality of acoustic linear antennas, said acoustic signals being intended to be used by said acoustic nodes to estimate the distances between said acoustic nodes;
  computing the local measurement as a function of the obtained acoustic signals.

Thus, the method does not require any specific measure equipment (astute use of the acoustic nodes, for a new function, in addition to their primary function).

According to a particular feature, said other linear antenna is adjacent to said first linear antenna.

Thus, in the case the first linear antenna is a master linear antenna, and the other linear antenna is a slave linear antenna, the hypothesis that the feather angles of these two linear antennas are equal is better verified. In other words, there is less bias (error) resulting from the fact feather angles of the two linear antennas (master and slave streamers) are not perfectly identical.

In a particular implementation, the step of obtaining the local measurement comprises steps of:
  obtaining a predetermined distance $d_{XY}$ separating a couple of first and second acoustic nodes X, Y placed along one of said couple of linear antennas;
  obtaining a first propagation duration $t_{XD}$ of an acoustic signal transmitted between the first acoustic node X and a third acoustic node D placed along the other of said couple of linear antennas;
  obtaining a second propagation duration $t_{YD}$ of an acoustic signal transmitted between the second acoustic node Y and the third acoustic node D;
  obtaining a value k of the underwater acoustic sound velocity;
  estimating, as a function of $t_{XD}$, $t_{YD}$, k and $d_{XY}$, a cross-line distance $d_{HD}$ between said first linear antenna and said other linear antenna, defined as the length of the altitude, passing through the third node D, of a triangle having as vertexes the first, second and third nodes X, Y and D, H being the foot of said altitude;
  estimating, as a function of $t_{XD}$, k and $d_{HD}$, a distance $d_{XH}$ or $d_{YH}$ separating the foot H and the first acoustic node X or the second acoustic node Y;
  estimating, as a function of $d_{XH}$ and a predetermined distance $d_{XB}$ separating the first acoustic node X and a fourth acoustic node B or as a function of $d_{YH}$ and a predetermined distance $d_{YB}$ separating the second acoustic node Y and the fourth acoustic node B, a distance $d_{HB}$ separating the foot H and the fourth acoustic node B, said distance $d_{HB}$ being used as the parameter linked to the feather angle, said fourth acoustic node B being arranged along the same linear antenna as the first and second nodes X, Y;
  if the obtained local measurement is the local measurement of the feather angle, estimating the feather angle as a function of $d_{HB}$ and $d_{HD}$.

According to a particular feature, the fourth acoustic node B is coincident with the first acoustic node X or the second acoustic node Y.

This allows to simplify the step of obtaining the local measurement.

According to a particular feature, one of said first, second, third and fourth acoustic nodes X, Y, D and B is integrated in said at least one of said navigation control devices.

This allows also to simplify the step of obtaining the local measurement.

According to a particular feature, the step of computing a lateral force is carried out also as a function of at least one other obtained local measurement associated with another one of said navigation control devices.

This allows to optimize the step of computing the lateral force (e.g. accelerate the enslavement of a control loop).

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention proposes a navigation control device arranged along a towed acoustic linear antenna in order to act at least laterally on the position of said linear antenna, characterized in that it comprises:
  means for obtaining a local measurement of a feather angle or of a parameter linked to the feather angle, said local measurement being associated with said navigation control device;
  means for computing a lateral force, as a function of the obtained local measurement; and
  means for applying the computed lateral force.

4. LIST OF FIGURES

Other features and advantages of embodiments of the invention shall appear from the following description, given by way of an indicative and non-exhaustive examples and from the appended drawings, of which:

FIG. 1, already described with reference to the prior art, presents an example of network of seismic streamers towed by a seismic vessel;

FIG. 2, already described with reference to the prior art, illustrates in detail the block referenced C in FIG. 1 (i.e. a portion of a streamer);

FIG. 3, already described with reference to the prior art, illustrates the binning coverage;

FIG. 4, already described with reference to the prior art, illustrates a feather angle on streamers (towed by a seismic vessel) caused by a lateral sea current;

FIGS. 9A and 9B illustrate an alternative case (compared with the particular case of FIGS. 5A and 5B) when the reference acoustic node B is not coincident with the point H when the local feather angle is a zero angle.

5. DETAILED DESCRIPTION

In all of the figures of the present document, identical elements and steps are designated by the same numerical reference sign.

The method described below, in the case of a lateral sea current, can also be applied in the case of a turn, in order to allow stabilizing quickly the streamer network and therefore decreasing the time spent in turns.

Figure 5A:
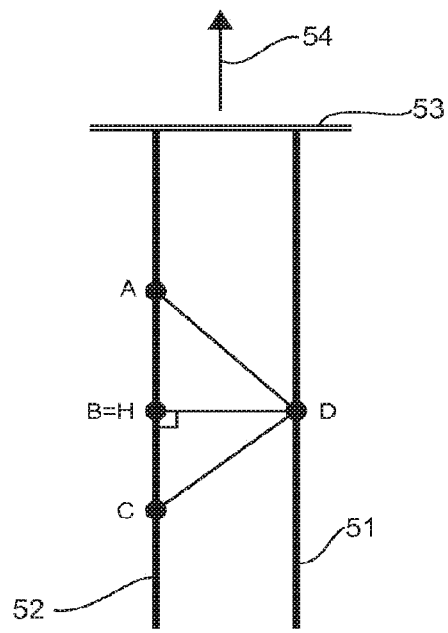
FIGS. 5A and 5B illustrate the general principle of the method according to an embodiment the invention, implemented in a navigation control device (bird), in the particular case when a reference acoustic node B is coincident with a point H (defined below) when the local feather angle is a zero angle.
Figure 5B:
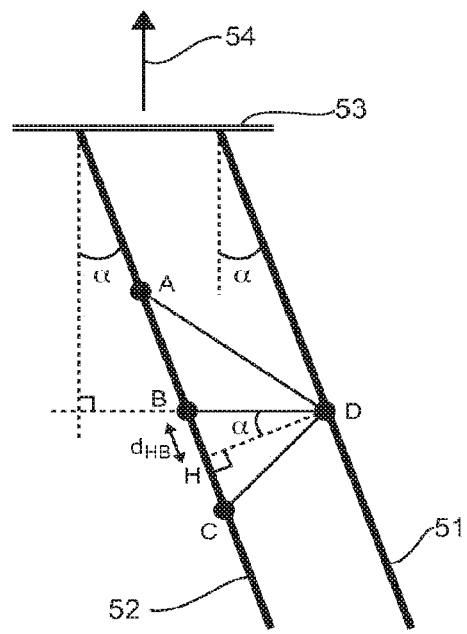

In the illustrative embodiment shown in FIGS. 5A and 5B, we consider a streamer network comprising a master streamer 51 and a slave streamer 52, towed by a vessel (not shown) via a head rigging 53.

It is clear however that an embodiment of the invention can be implemented with a streamer network comprising a greater number of slave streamers, and/or with more than one master streamer (in this case, the method according to the invention is carried out for each master streamer). More generally, an embodiment of the invention can be applied to control lateral steering of any streamer.

Figure 1:
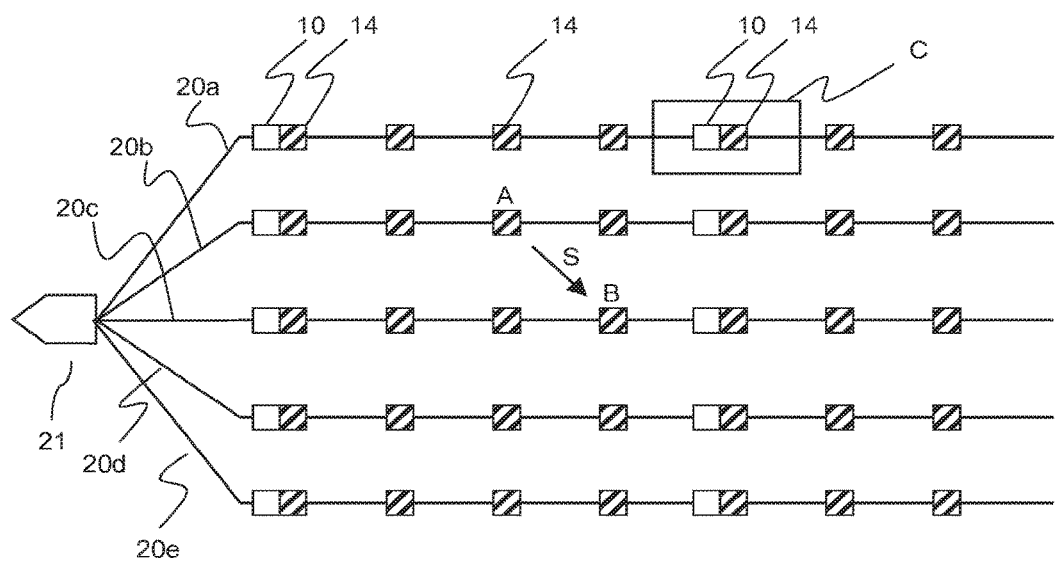
Figure 2:
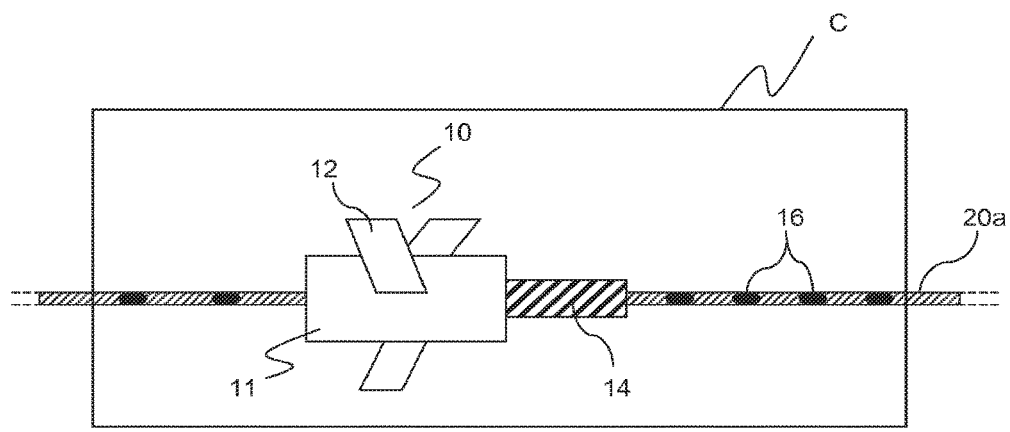
Figure 3:
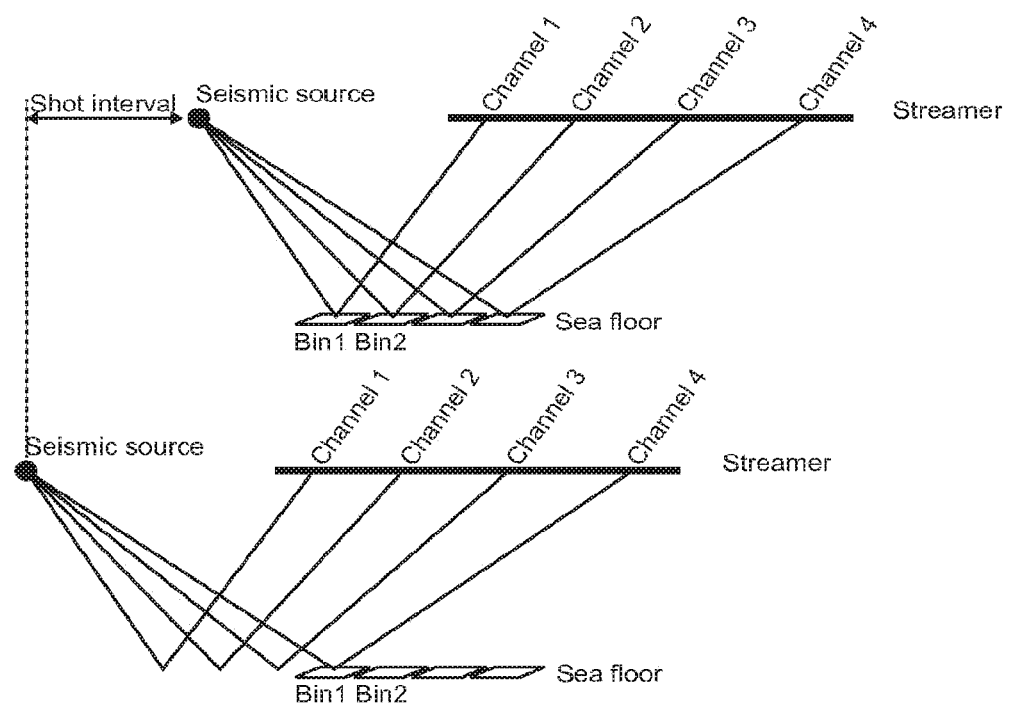
Figure 4:
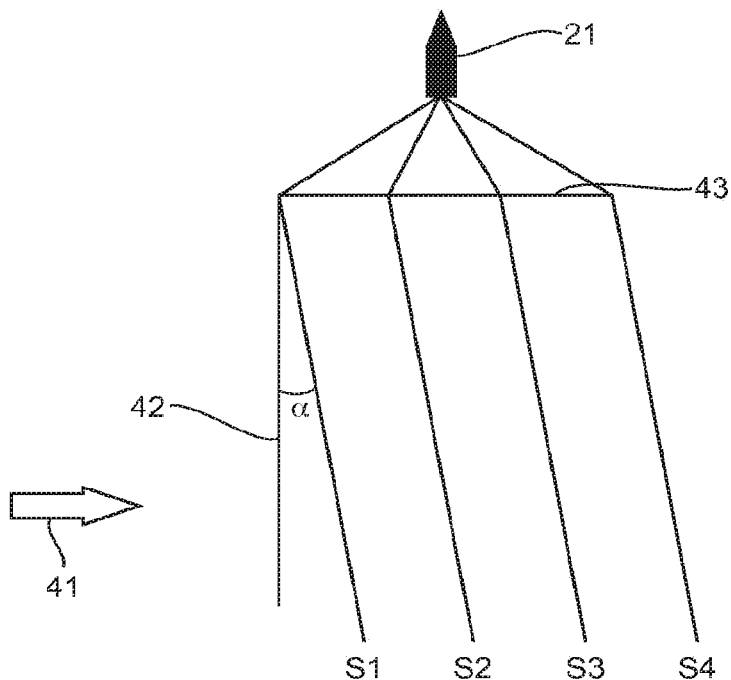

As already explained above in relation with FIGS. 1 and 2, navigation control devices ("birds") and acoustic nodes are arranged along each streamer 51, 52. Some acoustic nodes are integrated in a bird (case of FIG. 2), and other are not.

In the example illustrated in FIGS. 5A and 5B, we consider three acoustic nodes A, B and C arranged along the slave streamer 52, and one bird D, in which is integrated an acoustic node (called acoustic node D thereafter), arranged along the master streamer 51.

We discuss now a method according to a particular embodiment of the invention, implemented in the bird D. In practice, this method can be implemented in all (or almost all) the birds arranged along the master streamer 51 (or along each of the master streamers when there are several).

As already defined above, the feather angle α of a streamer is defined as the angle formed by this streamer relative to the axis along which the vessel moves. Considering that the slave streamer 52 and the master streamer 51 are parallels, then the feather angle α is the same for each streamer.

In FIG. 5A, we assume that the streamers 51, 52 are parallels to the axis 54 along which the vessel moves, then the feather angle α is equal to zero. In FIG. 5B, we assume that the streamers 51, 52 are not parallels to the axis 54 along which the vessel moves, theft the feather angle α is different from zero.

The constraint that the acoustic node D must be met in any triangle (XDY) having as vertexes two acoustic nodes X and Y (e.g. any of the following couples: A and C, A and B, B and C) is that said two acoustic nodes X and Y must be arranged along the slave streamer 52, and the acoustic node D must be arranged along the master streamer 51.

Computation of the Cross-Line Distance $d_{HD}$

A cross-line distance $d_{HD}$ between the slave and master linear antennas 51, 52 is defined as the length of the aforesaid altitude (having the foot H and passing through the acoustic node D, in the triangle (XDY).

We explain now how the cross-line distance $d_{HD}$ can be computed if the length of the sides of the triangle (XDY) are known. We note the lengths of the sides as follows: $d_{XY}=c$, $d_{YD}=a$, $d_{AD}=b$ and h the length of the altitude HD. By Heron's formula, the area of this triangle is:

$$Aera_{XDY} = \sqrt{s(s-a)(s-b)(s-c)}$$

where $s=\frac{1}{2}(a+b+c)$ is half of the triangle's perimeter.

But the area of a triangle can also be written with the well-known formula:

$$Aera_{XDY} = \frac{c \cdot h}{2}$$

where h (also noted $d_{HD}$) is the altitude having the foot H and passing through the vertex D, and c is the length of the base XY of the triangle XDY.

From these two above formulas for calculating area of the triangle XDY, we obtain the following:

$$s(s-a)(s-b)(s-c) = \frac{c^2 h^2}{4}$$

which, after simplifying, leads to the following formula (I):

$$d_{HD}^2 = h^2 = -\frac{(a+b+c)(a+b-c)(a-b-c)(a-b+c)}{4c^2} \quad (I)$$

In the example of FIGS. 5A and 5B, the cross-line distance $d_{HD}$ can be computed in each of the following cases, since triangles (ADB), (ADC) and (BDC) have the same altitude HD:
  if the length of the sides of the triangle (ADB) are known,
  if the length of the sides of the triangle (ADC) are known,
  if the length of the sides of the triangle (BDC) are known.

If several values of the cross-line distance $d_{HD}$ are computed (each in a different triangle), then a final value of the cross-line distance $d_{HD}$ is equal to the mean of these values (or any other combination of these values).

Computation of the Distance $d_{HB}$

We consider a distance $d_{HB}$ separating the foot H (which can be defined also as the orthogonal projection of the node D on the slave streamer 52) and a reference acoustic node B (arranged along the slave streamer 52).

In the particular embodiment of FIGS. 5A and 5B, the reference acoustic node B is coincident with the foot H when the local feather angle is a zero angle (α=0). In other words, the distance $d_{HB}$ is equal to zero when α is equal to zero, i.e. in the case of FIG. 5A (since B=H), and is different from zero when α is different from zero, i.e. in the case of FIG. 5B. In this particular embodiment, the distance $d_{HB}$ is the inline offset.

In alternative embodiments (e.g. in FIGS. 9A and 9B, in which the feather angle α is equal to zero and different from zero respectively), the reference acoustic node B is not coincident with the foot H when the local feather angle is a zero angle (α=0, see FIG. 9A). Therefore, when α=0 (as shown in FIG. 9A), the distance $d_{HB}$ is not equal to zero but to $H_0 B$, with $H_0$ the orthogonal projection of the node D when $\alpha=0$. In these alternative embodiments, the distance $d_{HB}$ is not the inline offset, the inline offset being the distance $HH_0$.

We explain now how the distance $d_{HB}$ can be computed with Pythagoras's theorem, if the cross-line distance $d_{HD}$ and some inter-node distances are known or computed (using acoustic signals coming from the adjacent streamer, and considering that the underwater acoustic sound velocity is known).

In a first example, we consider the triangle (ADB) to compute the cross-line distance $d_{HD}$, according to above formula (I), with $d_{AB}=c$, $d_{BD}=a$, $d_{AD}=b$. The distance $d_{AB}$ (between the acoustic nodes A and B) is known. The distances $d_{BD}$ (between the acoustic nodes B and D) and $d_{AD}$ (between the acoustic nodes A and D) are computed according to the following formula: $d_{BD}=t_{BD}\times k$ and $d_{AD}=t_{AD}\times k$, with $t_{BD}$ the acoustic propagation time between acoustic nodes B and D, and $t_{AD}$ the acoustic propagation time between acoustic nodes A and D. $t_{BD}$ and $t_{AD}$ are measured by the acoustic node D. k is the underwater acoustic sound velocity (which is either measured or estimated).

Then we have: $d_{AH}=\sqrt{d_{HD}^2-d_{HD}^2}$

And finally: $d_{HB}=d_{AB}-d_{AH}$

Per convention, $d_{HB}>0$ if H is between A and B, and $d_{HB}<0$ otherwise. In this first example, H is not between A and B.

In a second example, we consider the triangle (BDC) to compute the cross-line distance $d_{HD}$, according to above formula (I), with $d_{CB}=c$, $d_{BD}=a$, $d_{CD}=b$. The distance $d_{CB}$ (between the acoustic nodes C and B) is known. The distances $d_{BD}$ (between the acoustic nodes B and D) and $d_{CD}$ (between the acoustic nodes C and D) are computed according to the following formula: $d_{BD}=t_{BD}\times k$ and $d_{CD}=t_{CD}\times k$, with $t_{BD}$ the acoustic propagation time between acoustic nodes B and D, and $t_{CD}$ the acoustic propagation time between acoustic nodes C and D. $t_{BD}$ and $t_{CD}$ are measured by the acoustic node k is the underwater acoustic sound velocity (which is either measured or estimated).

Then we have: $d_{CH}=\sqrt{d_{CD}^2-d_{HD}^2}$

And finally: $d_{HB}=d_{CB}-d_{CH}$

Per convention, $d_{HB}>0$ if H is between B and C, and $d_{HB}<0$ otherwise. In this second example, H is between B and C.

In a third example, we consider the triangle (ADC) to compute the cross-line distance $d_{HD}$, according to above formula (I), with $d_{AC}=c$, $d_{AD}=b$, $d_{CD}=a$. The distance $d_{AC}$ (between the acoustic nodes A and C) is known. The distances $d_{AD}$ (between the acoustic nodes A and D) and $d_{CD}$ (between the acoustic nodes C and D) are computed according to the following formula: $t_{AD}=t_{AD}\times k$ and $d_{CD}=t_{CD}\times k$, with $t_{AD}$ the acoustic propagation time between acoustic nodes A and D, and $t_{CD}$ the acoustic propagation time between acoustic nodes C and D. $t_{AD}$ and $t_{CD}$ are measured by the acoustic node D. k is the underwater acoustic sound velocity (which is either measured or estimated).

Then we have: $d_{CH}=\sqrt{d_{CD}^2-d_{HD}^2}$

And finally: $d_{HB}=d_{CB}-d_{CH}$, where $d_{CB}$ (the distance between the acoustic nodes C and B) is known.

Per convention, $d_{HB}>0$ if H is between B and C, and $d_{HB}<0$ otherwise. In this third example, H is between B and C.

Computation of the Feather Angle $\alpha$

The distance $d_{HB}$ is a parameter linked to the feather angle $\alpha$, because of the head streamer rigging 53 which maintains a same offset of the streamers per comparison to the vessel.

In the particular embodiment of FIGS. 5A and 5B, knowing the distance $d_{HB}$ (which is also the inline offset in this particular embodiment) and the cross-line distance $d_{HD}$, the feather angle $\alpha$ can be computed using the following formula (II):

$$\alpha = \arctan\left(\frac{d_{HB}}{d_{HD}}\right) \tag{II}$$

Computation of the Lateral Force

The bird D computes the lateral force to be applied (by the motorized pivoting wings 12), as a function of the computed distance $d_{HB}$ (local measurement of a parameter linked to the feather angle $\alpha$).

In a particular embodiment, the lateral force is computed with a local PID ("Proportional-Integral-Derivative") control loop which enslaves the computed distance $d_{HB}$ (also referred to as "computed inline offset" in the particular embodiment of FIGS. 5A and 5B) on a setpoint.

As detailed below, in relation with FIG. 8, the setpoint is either a predetermined value or a dynamically computed value.

In an alternative embodiment, the bird D computes the lateral force as a function of the computed feather angle $\alpha$ (local measurement of the feather angle $\alpha$), e.g. with a local PID control loop which enslaves the computed feather angle $\alpha$ on a feather angle setpoint.

In an alternative embodiment, the computation of the distance $d_{HB}$ (or of the feather angle $\alpha$) is carried out by another device D'; e.g. an acoustic node which is close to the bird D (D must be replaced by D' in all above computation details and formulas). Then the bird D receives the measurement (i.e. the computed distance $d_{HB}$ or the computed feather angle $\alpha$) and computes the lateral force as a function of this received measurement and a setpoint.

In an alternative embodiment, the computation of the lateral force is also carried out by aforesaid other device. Then the bird D receives only the computed lateral force (i.e. a signal indicating to the bird D which lateral force has to be applied).

Figure 8:
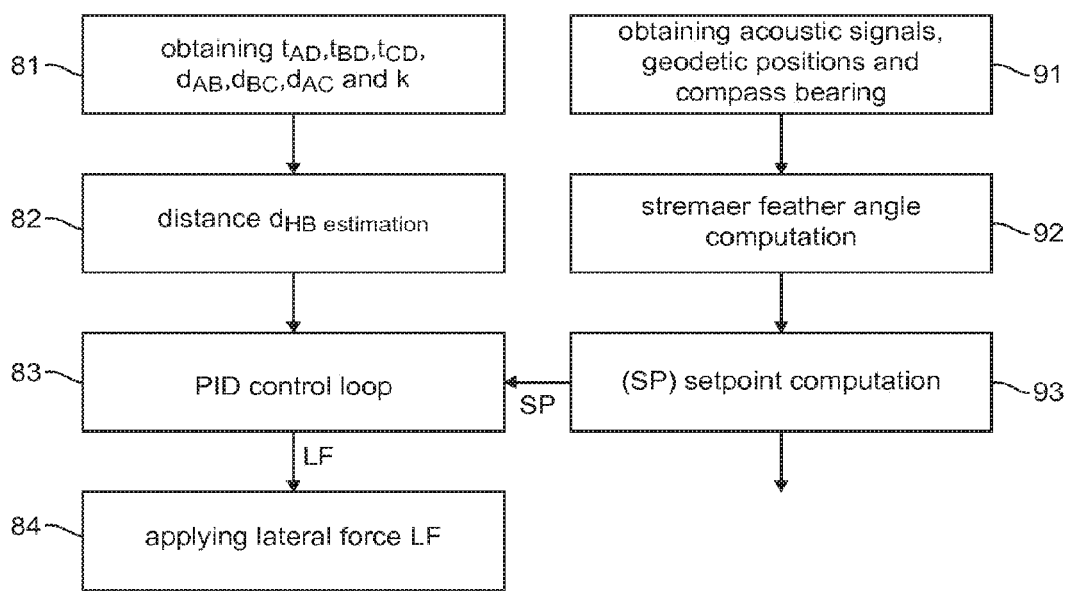
FIG. 8 is a flowchart of a particular embodiment of the method according to the invention.

The left part of FIG. 8 is a flowchart of a particular embodiment of the method according to the invention, implemented by the bird D (see FIGS. 5A and 5B).

In a step 81, the bird D obtains acoustic propagation times (e.g. $t_{AD}$, $t_{BD}$ and $t_{CD}$), known inter-node distances (e.g. $d_{AB}$, $d_{BC}$ and $d_{AC}$) and the underwater acoustic sound velocity (k, which is either measured or estimated).

In a step 82, the bird D computes the distance $d_{HB}$ (local measurement of a parameter linked to the feather angle $\alpha$).

In a step 83, the bird D computes a lateral force LT to be applied, as a function of the computed distance $d_{HB}$, e.g. with a local PID control loop which enslaves the computed distance $d_{HB}$ on a setpoint SP.

In a step 84, the bird D applies (with the motorized pivoting wings 12) the computed lateral force LF.

First Implementation

In a first implementation, the setpoint SP is a predetermined value (for example corresponding to a feather angle of 0°, 5° or 10°). This predetermined value can be stored in a memory of the bird D. It can also be sent to the bird D by a master streamer controller (comprised e.g. in the navigation system or any other control system, on board of the seismic vessel).

In order to locally compute the lateral force to apply, the bird D only takes in account the locally measured distance $d_{HB}$ and the pre-established set point.

This allows to keep an optimised feather angle of the master streamer 51, even if none connection to the master streamer controller is available (streamer disconnection, a master streamer controller powered off, etc).

As the slave streamers (52 in FIGS. 5A and 5B) keep a separation with the attached master streamer, then the feather angle is reduced on the whole streamer network, even if none connection is available between the master streamer 51 and the master streamer controller.

Second Implementation

In practice, the streamer feather angle α caused by the lateral sea current can regularly be much higher than 10°, whereas the birds can typically correct a feather angle of approximately 3°.

Moreover, the distance $d_{HB}$ (i.e. the inline offset in the particular embodiment of FIGS. 5A and 5B) measured by each bird along a streamer may be different due to the streamer distortion.

Each function, streamer angle reduction and distortion reduction, has a cost on the lateral force which can be expressed in lateral force dynamic. Then if, on a master streamer the whole dynamic of lateral force is used for streamer angle reduction, then the streamer still may be distorted.

Moreover, in that case the whole dynamic of lateral force of the slave streamer may also be used, as the slave streamer try to keep a fixed streamer separation (cross-line distance) with respect to the attached master streamer. It could result to a loss of streamer separation, which can be worth than a presence of a feather angle.

Finally, it may be beneficial for binning coverage or 4D repeatability to remove streamer distortion instead of trying to reduce to 7° the streamer feather angle without reducing the streamer distortion.

So, in a second implementation, the method according to the invention is used to keep a same global feather angle $\alpha_g$ along a streamer, reducing the streamer distortion, and keeping a free dynamic of lateral force on the birds of slave streamers.

Figure 6:
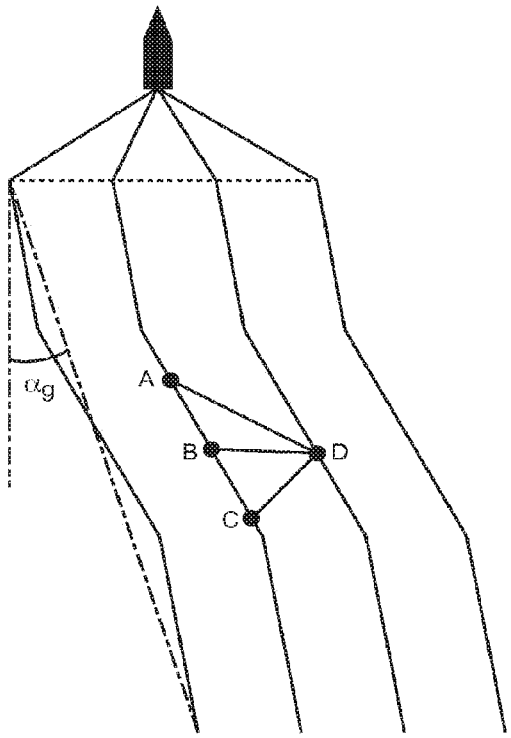
FIG. 6 illustrates a global feather angle $\alpha_g$, used in an alternative embodiment of the invention.

As illustrated in FIG. 6, the global feather angle $\alpha_g$ (also referred to as the "streamer feather angle"), is the mean feather angle over a streamer (different of the feather angle measured by a bird, also referred to above as "the local measurement of the feather angle"). It can be computed in real time by the navigation system (step 92, part right of FIG. 8), e.g. with a least square algorithm which uses, as inputs, acoustic signals, geodetic positions and compass bearing (these inputs are obtained in step 91, part right of FIG. 8).

The streamer feather angle $\alpha_g$ can be used to determine the set point SP for all the birds along the master streamer 51 (step 93, part right of FIG. 8). Then the distortion along the streamers may be reduced without modifying the streamer feather angle.

In that case, and in the particular context of FIGS. 5A and 5B, the set point SP is defined by:

$$SP = CROSSLINE\_DISTANCE\_SETPOINT \cdot \tan(\alpha_g)$$

where CROSSLINE_DISTANCE_SETPOINT is the streamer separation (crossline distance) setpoint, and $\alpha_g$ is the effective streamer feather angle.

Figure 7:
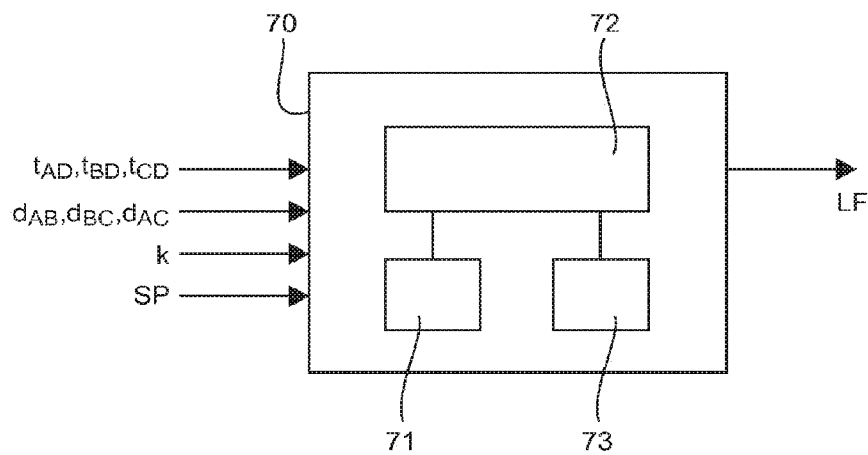
FIG. 7 shows the simplified structure of a navigation control device (bird) according to a particular embodiment of the invention.

Now referring to FIG. 7, we present the simplified structure of a navigation control device 70 (bird D in the above discussion) according to a particular embodiment of the invention.

The navigation control device 70 comprises a read-only memory (ROM) 73, a random access memory (RAM) 71 and a processor 72. The read-only memory 73 (non transitory computer-readable carrier medium) stores executable program code instructions, which are executed by the processor 72 in order to enable implementation of the technique of an embodiment of the invention (e.g. the steps 81 to 84 of FIG. 8).

Upon initialization, the aforementioned program code instructions are transferred from the read-only memory 73 to the random access memory 71 so as to be executed by the processor 72. The random access memory 71 likewise includes registers for storing the variables and parameters required for this execution. The processor 72 receives the following information:
  acoustic propagation times (e.g. $t_{AD}$, $t_{BD}$ and $t_{CD}$);
  known inter-node distances (e.g. $d_{AB}$, $d_{BC}$ and $d_{AC}$);
  a measured value of the underwater acoustic sound velocity (k). In an alternative embodiment, this value is estimated by the processor 72 (see Patent Application EP 11305835.8);
  the setpoint SP.

According to the program code instructions, the processor 72 delivers the computed lateral force LF (see steps 82 and 83 in FIG. 8), to be applied by the motorized pivoting wings 12.

All the steps of the above estimation method can be implemented equally well:
  by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
  by a dedicated machine or component, such as an FPGA (Field Programmable Gate Array), an ASIC (Application-Specific Integrated Circuit) or any dedicated hardware component.

At least one embodiment of the present disclosure provides a technique for steering laterally a towed acoustic linear antenna, this technique allowing to improve binning coverage and 4D repeatability of marine surveys.

At least one embodiment provides a technique of this kind which does not need any global control of the navigation control devices ("birds"), in order to keep a stable streamer network, even in the three aforesaid situations.

At least one embodiment provides a technique of this kind which allows to decrease the time spent in turns, by speeding up the stabilisation of the streamer network at the end of a turn.

At least one embodiment provides a technique of this kind that is simple to implement and costs little.

The invention claimed is:

1. A method for steering in water a master acoustic linear antenna, the method comprising:
  receiving acoustic propagation times between (i) first, second and third nodes located on a slave acoustic linear antenna and (ii) a node located on the master acoustic linear antenna, wherein the slave linear acoustic antenna follows a shape of the master linear acoustic antenna;

calculating, in at least one navigation control device attached to the node located on the master acoustic linear antenna, a local measurement of (i) a feather angle or (ii) a parameter linked to the feather angle based on the acoustic propagation times, inter-node distances between the first, second and third nodes along the slave acoustic linear antenna, and a speed of sound in water;

obtaining a feather angle set point;

applying with the at least one navigation control device a lateral force to the master acoustic linear antenna; and controlling, based on the local measurement and the feather angle set point, the applied lateral force.

2. The method of claim 1, further wherein the applying of the lateral force is achieved with motorized pivoting wings of the at least one navigation control device.

3. The method of claim 1, wherein the at least one navigation control device is a bird that controls a lateral movement of the master acoustic linear antenna.

4. The method of claim 1, further comprising:
performing a control loop with the at least one navigation control device for controlling the lateral force.

5. The method of claim 4, wherein the control loop is implemented with a proportional-integral-derivative loop.

6. The method of claim 1, wherein the at least one navigation control device includes a processor that receives as input (1) the acoustic propagation times between the navigation control device and the first, second and third nodes, (2) the inter-node distances, (3) the speed of sound in water, and (4) the feather angle set point, and the processor controls the lateral force applied by motorized pivoting wings based on inputs (1) to (4).

7. The method of claim 1, wherein the feather angle set point has a predetermined value.

8. The method of claim 7, wherein the predetermined value is sent by a master streamer controller.

9. The method of claim 1, wherein the feather angle set point is dynamically computed.

10. The method of claim 1, wherein the feather angle set point is a global feather angle of the master acoustic linear antenna.

11. The method of claim 10, wherein the local measurement is the feather angle and the local measurement of the feather angle characterizes a part of the master acoustic linear antenna.

12. The method of claim 1, wherein the step of calculating comprises:
selecting the at least one navigation control device (D) attached to the master acoustic linear antenna and a reference node (B) attached to the slave acoustic linear antenna;
calculating a cross-line distance $d_{HD}$ between the master and slave acoustic linear antennas, wherein point H is on the slave acoustic linear antenna and the distance $d_{HD}$ is perpendicular to both the master and slave acoustic linear antennas; and
calculating a distance $d_{HB}$ between the reference node (B) and point H,
wherein the distance $d_{HB}$ is the parameter linked to the feather angle which is the local measurement.

13. A navigation control device for steering in water a master acoustic linear antenna, the navigation control device comprising:
a processor that receives acoustic propagation times between (i) first, second and third nodes located on a slave acoustic linear antenna and (ii) a node located on the master acoustic linear antenna, wherein the slave linear acoustic antenna follows a shape of the master linear acoustic antenna, calculates a local measurement of (i) a feather angle or (ii) a parameter linked to the feather angle of the master acoustic linear antenna based on the acoustic propagation times, inter-node distances between the first, second and third nodes along the slave acoustic linear antenna, and a speed of sound in water, and obtains a feather angle set point; and at least one navigation control device having motorized wings that apply a lateral force to the master acoustic linear antenna, wherein the processor controls, based on the local measurement and the feather angle set point, the applied lateral force through the motorized wings.

14. The navigation control device of claim 13, wherein the processor implements a proportional-integral-derivative loop for controlling the lateral force.

15. The navigation control device of claim 13, wherein the processor receives as input (1) acoustic propagation times between the navigation control device and the first, second and third nodes, (2) the inter-node distances, (3) the speed of sound in water, and (4) the feather angle set point, and the processor controls the lateral force to be applied by motorized pivoting wings based on inputs (1) to (4).

16. The navigation control device of claim 13, wherein the feather angle set point is a global feather angle of the master acoustic linear antenna.

17. The navigation control device of claim 16, wherein the local measurement is the feather angle and the local measurement of the feather angle characterizes a part of the master acoustic linear antenna.

18. The navigation control device of claim 17, wherein the slave linear acoustic antenna follows a shape of the master linear acoustic antenna.

19. A non-transitory computer readable medium storing a program which, when executed by a processor, causes the processor to perform the steps of:

receiving acoustic propagation times between (i) first, second and third nodes located on a slave acoustic linear antenna and (ii) a node located on the master acoustic linear antenna, wherein the slave linear acoustic antenna follows a shape of the master linear acoustic antenna;

calculating, in at least one navigation control device attached to the master acoustic linear antenna, a local measurement of (i) a feather angle or (ii) a parameter linked to the feather angle based on the acoustic propagation times, inter-node distances between the first, second and third nodes along the slave acoustic linear antenna, and a speed of sound in water;

obtaining a feather angle set point;

applying with the at least one navigation control device a lateral force to the master acoustic linear antenna; and controlling, based on the local measurement and the feather angle set point, the applied lateral force.

20. The method of claim 1, wherein the lateral force is determined so as to make the feather angle match the set angle and/or to reduce distortion of the master streamer.

* * * * *